(12) United States Patent
Kaji

(10) Patent No.: US 6,523,428 B2
(45) Date of Patent: *Feb. 25, 2003

(54) SHIFT LEVER BOOT

(75) Inventor: Yasuhisa Kaji, Chiba (JP)

(73) Assignee: Kinugawa Rubber Ind. Co., Ltd., Chiba (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/513,223

(22) Filed: Feb. 25, 2000

(65) Prior Publication Data

US 2002/0050181 A1 May 2, 2002

(30) Foreign Application Priority Data

Feb. 26, 1999 (JP) .............................. 11-49486

(51) Int. Cl.⁷ .............................. F16J 15/50; G05G 1/00
(52) U.S. Cl. ..................... 74/18.1; 74/18.2; 74/470; 74/566
(58) Field of Search .................. 74/18, 18.1, 471 R, 74/609, 566, 473.3, 470

(56) References Cited

U.S. PATENT DOCUMENTS

| | | | | | |
|---|---|---|---|---|---|
| 3,668,938 A | * | 6/1972 | Dimitry | ...................... | 74/18 X |
| 4,237,998 A | * | 12/1980 | Matayoshi | .................. | 181/175 |
| 4,522,081 A | * | 6/1985 | Mackin et al. | ............ | 74/473 R |
| 4,732,232 A | * | 3/1988 | Miyagi et al. | .............. | 180/336 |
| 4,991,457 A | * | 2/1991 | Chen | ........................ | 74/473 R |
| 5,027,665 A | * | 7/1991 | Hayward | .................... | 74/18.1 |
| 5,311,912 A | * | 5/1994 | Hayward | .................... | 138/121 |
| 5,749,261 A | * | 5/1998 | Numakami | ................. | 74/18.1 |
| 5,975,609 A | * | 11/1999 | Campbell | .................. | 296/39.3 |

FOREIGN PATENT DOCUMENTS

| | | | | | |
|---|---|---|---|---|---|
| EP | 0704336 A | * | 4/1996 | ................ | 74/18.1 |
| JP | 59-19430 | | 2/1984 | .................... | 74/18 |
| JP | 8-192652 | * | 7/1996 | ................ | 74/18.1 |
| JP | 10-264669 | * | 10/1998 | ................ | 74/18.1 |
| JP | 2000-247160 | * | 9/2000 | ................ | 74/18.1 |
| JP | 2001-55056 | * | 2/2001 | ................ | 74/18.1 |

* cited by examiner

Primary Examiner—Vinh T. Luong
(74) Attorney, Agent, or Firm—Foley & Lardner

(57) ABSTRACT

A shift lever boot includes a top face having a shift lever hole face and including a plurality of crests and a plurality of valleys, and a bellow-like skirt continuously connected to edges of the top face. All ridgelines of the crests and the valleys are parallel with respect to the cross direction of a motor vehicle.

5 Claims, 3 Drawing Sheets

SHIFT LEVER BOOT

BACKGROUND OF THE INVENTION

The present invention relates to a shift lever boot for a motor vehicle.

A shift lever for a motor vehicle with manual transmission is provided with a flexible shift lever boot. The shift lever is movable in two directions or in the cross and longitudinal directions of the motor vehicle, wherein the maximum angle of inclination is generally determined to be larger in the longitudinal direction than in the cross direction.

A shift lever boot of this type is disclosed, for example, in JP-U 59-19430. Referring to FIG. 4, this shift lever boot 30 includes a top face 36 having a hole 34 for a shift lever 32 and formed like concentric bellows with respect to the hole 34, and a skirt 38 continuously connected to edges of the top face 36 and formed like bellows. Such bellows-like construction allows excellent followability upon operation of the shift lever 32.

With the above shift lever boot 30, however, the top face 36 is formed like concentric bellows with respect to the shift lever hole 34, so that when the shift lever 32 gets the maximum angle of inclination in the longitudinal direction of the motor vehicle, the flexibility of the top face 36 becomes worse in the longitudinal direction than in the cross direction. Specifically, since the rigidity is locally increased in portions of the top face 36 where ridgelines of crests 40 and valleys 42 of the bellows are parallel with respect to the inclination of the shift lever 32, the flexibility of the top face 36 is degraded in the longitudinal direction where the shift lever 32 has larger maximum angle of inclination relative to in the cross direction where the shift lever 32 has smaller maximum angle of inclination. This may result in occurrence of a clearance between the shift lever hole 34 and the shift lever 32.

Referring to FIG. 5, air entering into the shift lever boot 30 from the clearance increases a volume of the shift lever boot 30, pushing the shift lever hole 34 upward as shown in FIG. 5. In this state, if the shift lever 32 is moved to the neutral position, the clearance between the shift lever hole 34 and the shift lever 32 disappears before fully evacuating air that entered into the shift lever boot 30. Specifically, each shift operation increases a volume of the shift lever boot 30, which moves the shift lever hole 34 upward. This may cause a buckling in a portion of the skirt 38 where the bellows is stretched as shown by a broken line C in FIG. 5, resulting in a possible fracture of the skirt 38 in this portion.

It is, therefore, an object of the present invention to provide a shift lever boot for a motor vehicle that is free from the above inconvenience, and has improved durability.

SUMMARY OF THE INVENTION

A first aspect of the present invention lies in a boot adapted for a shift lever of a motor vehicle, wherein the shift lever is movable in cross and longitudinal directions of the motor vehicle, and wherein the boot comprises: a top face, the top face having a hole for the shift lever and edges, the top face being made of a material with flexibility, the top face having first and second portions with respect to the hole along the longitudinal direction of the motor vehicle, each of the first and second portions (G1, G2) exclusively including a plurality of crests and a plurality of valleys linearly extending along the cross direction of the motor vehicle, all ridgelines of the crests and the valleys being parallel with respect to the cross direction of the motor vehicle; and a skirt continuously connected to the edges of the top face, the skirt being formed like bellows, the skirt being made of the material with flexibility.

A second aspect of the present invention resides in a boot for a shift lever of a motor vehicle, wherein the shift lever is movable in cross and longitudinal directions of the motor vehicle, and wherein the boot comprises: a top face, the top face having a hole for the shift lever and edges, the top face being made of a material with flexibility, the top face exclusively including a plurality of crests and a plurality of valleys, the crests and the valleys linearly extending along the cross direction of the motor vehicle, all ridgelines of the crests and the valleys being parallel with respect to the cross direction of the motor vehicle; and a skirt continuously connected to the edges of the top face, the skirt being formed like bellows, the skirt being made of the material with flexibility, wherein the top face is of the same thickness as that of the skirt.

A third aspect of the present invention resides in a boot for a shift lever of a motor vehicle, wherein the shift lever is movable in cross and longitudinal directions of the motor vehicle, and wherein the boot comprises: a top face, the top face having a hole for the shift lever and edges, the top face being made of a material with flexibility, the top face exclusively including a plurality of crests and a plurality of valleys, the crests and the valleys linearly extending along the cross direction of the motor vehicle, all ridgelines of the crests and the valleys being parallel with respect to the cross direction of the motor vehicle; and a skirt continuously connected to the edges of the top face, the skirt being formed like bellows, the skirt being made of the material with flexibility, wherein the top face is of a smaller thickness than that of the skirt.

A fourth aspect of the invention resides in a boot for enclosing a portion of an automotive gear shift lever, the boot comprising: a rectangular cross-sectional corrugated skirt; and a rectangular top face formed at an upper portion of the rectangular cross-sectional corrugated skirt, the top face having first and second groups (G1, G2) of straight corrugations which are all parallel to each other, and a hole arranged between the first and second groups and adapted for a gear shift lever to extend therethrough.

DETAILED DESCRIPTION OF THE INVENTION

Figure 1:
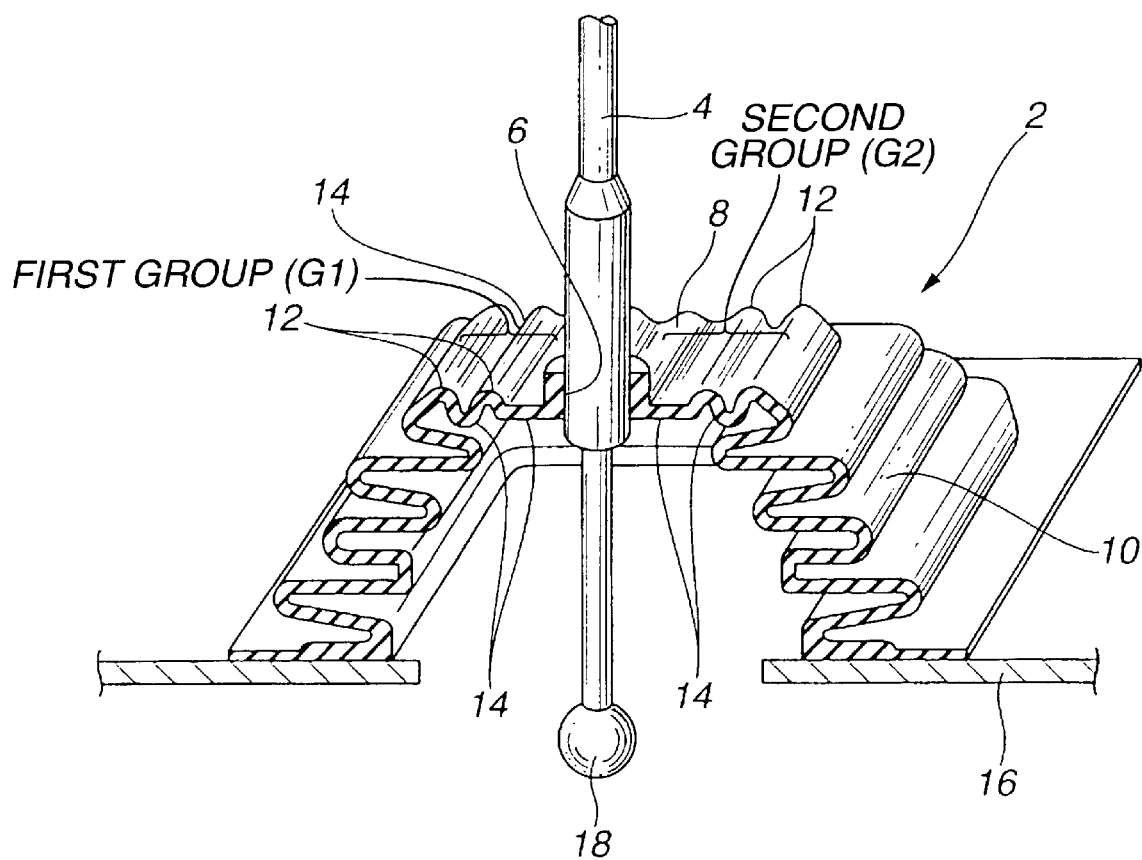
FIG. 1 is a perspective sectional view showing a first embodiment of a shift lever boot, in the neutral position, according to the present invention.

Referring to the drawings, a shift lever boot for a motor vehicle embodying the present invention will be described in detail.

Figure 2:
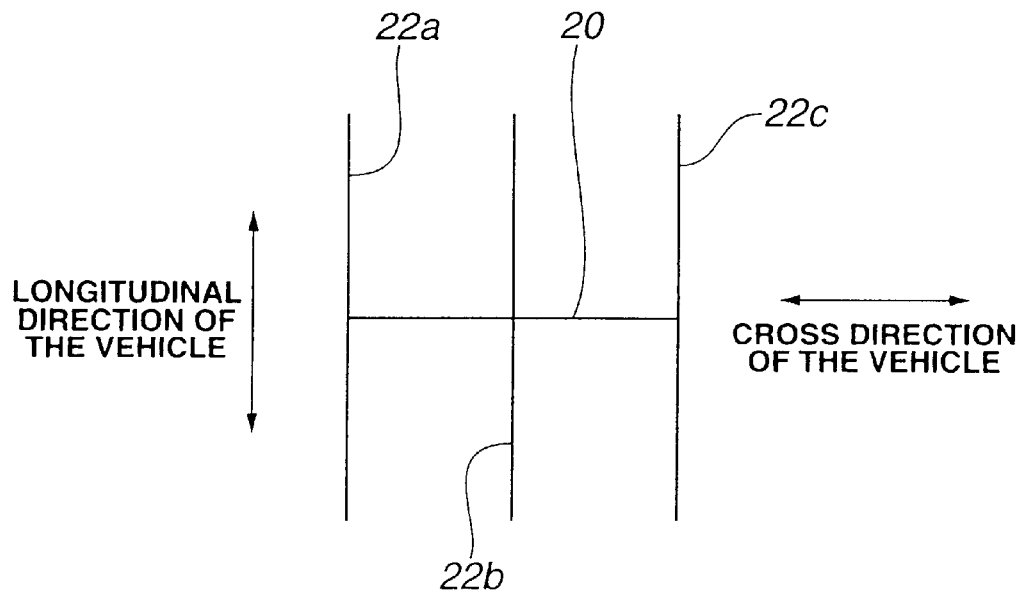
FIG. 2 is a schematic view showing a locus of a shift lever hole upon shift operation, which is in intimate contact with a shift lever.

FIGS. 1–2 show a first embodiment of the present invention. Referring to FIG. 1, a shift lever boot 2 is made of a material with flexibility such as rubber, synthetic resin or the like, and is shaped substantially like a bottomed tube. Specifically, the shift lever boot 2 includes a top face 8 having a hole 6 for a shift lever 4 that is movable in two directions or in the cross and longitudinal directions of the motor vehicle, and a bellows-like skirt 10 continuously connected to edges of the top face 8 and having the same thickness as that of the top face 8.

The top face 8 of the shift lever boot 2 is substantially of a corrugated sheet having a plurality of crests 12 and a plurality of valleys 14, wherein all ridgelines of the crests 12 and the valleys 14 are parallel with respect to the cross direction of the motor vehicle.

The skirt 10 has opening-side edges fixed to a console panel 16.

The shift lever 4 is movable with respect to a base 18 as a fulcrum. Referring to FIG. 2, in accordance with this motion, a portion of the shift lever 4 making contact with the shift lever hole 6 is moved along a locus as shown in FIG. 2. Specifically, the contact portion is moved along a select-direction line segment 20 parallel with respect to the cross direction of the motor vehicle, and along three shift-direction line segments 22a, 22b, 22c perpendicular to the select-direction line segment 20. When the shift lever 4 reaches each end of the shift-direction line segments 22a, 22b, 22c, one of the first to fifth and reverse gears is selected.

At each end of the shift-direction line segments 22a, 22b, 22c, the shift lever 4 gets the maximum angle of inclination in the longitudinal direction of the motor vehicle. And on the shift-direction line segments 22a, 22c connected to both ends of the select-direction line segment 20, the shift lever 4 gets the maximum angle of inclination in the cross direction of the motor vehicle. The 4, maximum angle of inclination is substantially two times larger in the longitudinal direction than in the cross direction.

With the shift lever boot 2 constructed in such a way, all ridgelines of the crests 12 and the valleys 14 of the top face 8 are parallel with respect to the cross direction of the motor vehicle. This can improve the flexibility of the top face 8 when the shift lever 4 is inclined in the longitudinal direction of the motor vehicle where it has the largest angle of inclination.

There is a possibility that all ridgelines of the crests 12 and the valleys 14 of the top face 8 adversely affect the flexibility of the top face 8 when the shift lever 4 is inclined in the cross direction of the motor vehicle. However, since the shift lever 4 has fully smaller maximum angle of inclination in the cross direction than in the longitudinal direction, only the effect of the flexibility of the bellows-like skirt 10 continuously connected to the edges of the top face 8 allows full following of the top face 8 with respect to the inclination of the shift lever 4 in the cross direction.

Therefore, the shift lever hole 6 of the top face 8 can always be maintained in intimate contact with the outer peripheral face of the shift lever 4, which enables prevention of increased volume of the shift lever boot 2 by air entering therein from the shift lever hole 6. This enables prevention of occurrence of a stretching of the bellows of the skirt 10 and thus a buckling thereof, preventing a fracture of the skirt 10 resulting therefrom.

Figure 3:
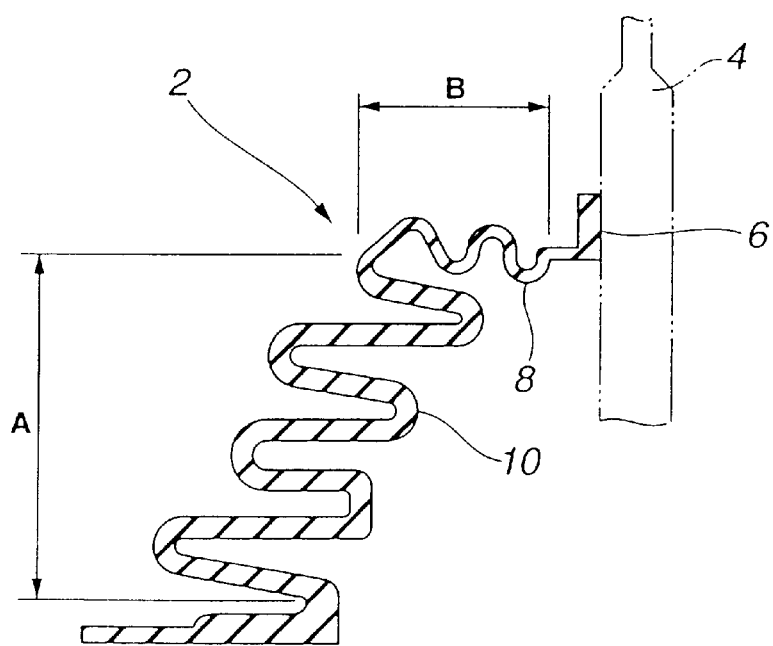
FIG. 3 is a fragmentary sectional view showing a second embodiment of the present invention.
Figure 4:
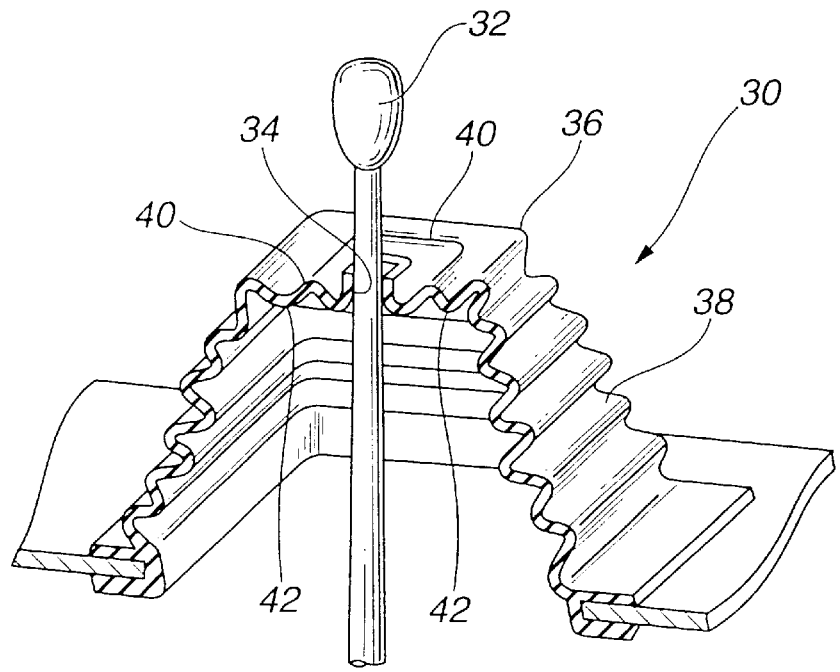
FIG. 4 is a view similar to FIG. 1, showing a known shift lever boot in the neutral position.
Figure 5:
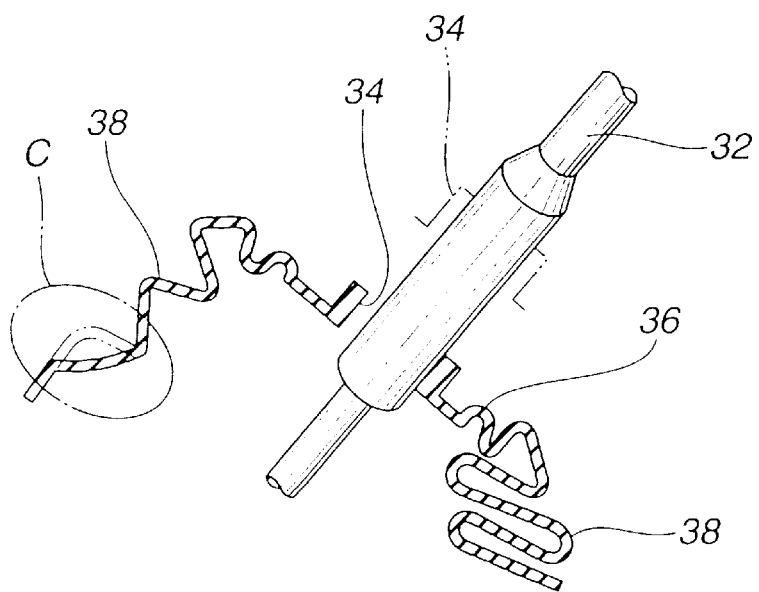
FIG. 5 is a view similar to FIG. 3, showing the known shift lever boot when the gear is selected.

FIG. 3 shows a second embodiment of the present invention. In the second embodiment, the thickness of an area B of the top face 8 is smaller than that of an area A of the skirt 10. Thus, the top face 8 of the second embodiment is excellent in the flexibility than that of the first embodiment, obtaining further improved contact of the shift lever hole 6 with the shift lever 4.

Having described the present invention with regard to the preferred embodiments, it is noted that the present invention is not limited thereto, and various modifications and changes can be made without departing from the scope of the present invention.

What is claimed is:

1. An arrangement for a motor vehicle, comprising:
   a shift lever which is movable in cross and longitudinal directions of the motor vehicle; and
   a boot comprising:
      a top face, said top face having a hole for said shift lever and edges, said top face being made of a material with flexibility, said top face having first and second portions with respect to said hole along the longitudinal direction of the motor vehicle, each of said first and second portions including a plurality of crests and a plurality of valleys linearly extending along the cross direction of the motor vehicle and being free of a crest and a valley linearly extending along the longitudinal direction of the motor vehicle, all ridgelines of said plurality of crests and said plurality of valleys being parallel with respect to the cross direction of the motor vehicle; and
      a skirt continuously connected to said edges of said top face, said skirt being formed like bellows, said skirt being made of said material with flexibility.

2. The arrangement as claimed in claim 1, wherein said top face is of the same thickness as that of said skirt.

3. The arrangement as claimed in claim 1, wherein said top face is of a smaller thickness than that of said skirt.

4. An arrangement for a motor vehicle, comprising:
   a shift lever which is movable in cross and longitudinal directions of the motor vehicle; and
   a boot comprising:
      a top face, said top face having a hole for said shift lever and edges, said top face being made of a material with flexibility, said top face having first and second portions with respect to said hole along the longitudinal direction of the motor vehicle, each of said first and second portions including a plurality of crests and a plurality of valleys linearly extending along the cross direction of the motor vehicle and being free of a crest and a valley linearly extending along the longitudinal direction of the motor vehicle, all ridgelines of said plurality of crests and said plurality of valleys being parallel with respect to the cross direction of the motor vehicle; and
      a skirt continuously connected to said edges of said top face, said skirt being formed like a bellows, said skirt being made of said material with flexibility, said top face being of the same thickness as that of said skirt.

5. An arrangement for a motor vehicle, comprising:
   a shift lever which is movable in cross and longitudinal directions of the motor vehicle; and
   a boot comprising:
      a top face, said top face having a hole for said shift lever and edges, said top face being made of a material with flexibility, said top face having first and second portions with respect to said hole along the longitudinal direction of the motor vehicle, each of said first and second portions including a plurality of crests and a plurality of valleys linearly extending along the cross direction of the motor vehicle and being free of a crest and a valley linearly extending along the longitudinal direction of the motor vehicle, all ridgelines of said plurality of crests and said plurality of valleys being parallel with respect to the cross direction of the motor vehicle; and a skirt continuously connected to said edges of said top face, said skirt being formed like a bellows, said skirt being made of said material with flexibility, said top face being of a smaller thickness than that of said skirt.

* * * * *